3,679,654
INTERFERON OR VIRAL INHIBITOR PROTEIN INDUCTION
Roland Maes, Rio de Janeiro, Brazil
(94 Bondgenotenlaan, 3000 Leuven, Belgium)
Filed Aug. 11, 1969, Ser. No. 848,959
Claims priority, application Brazil, Aug. 20, 1968, 201,650
Int. Cl. C07c *103/52*
U.S. Cl. 260—112.5      10 Claims

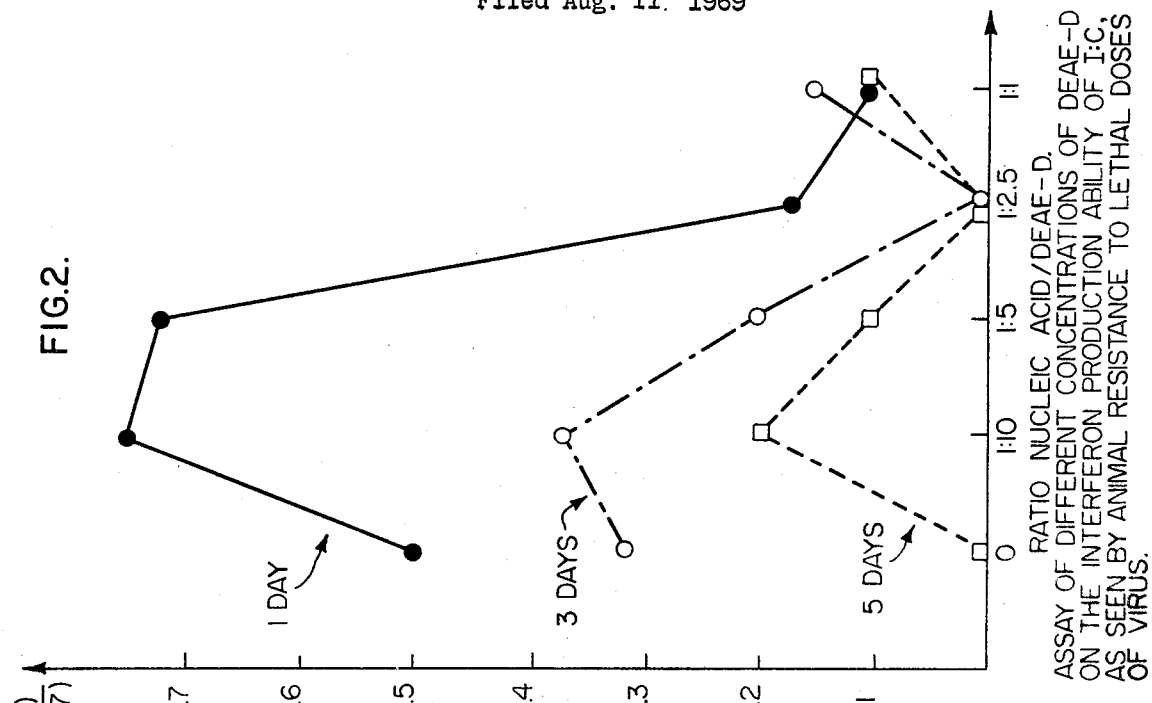
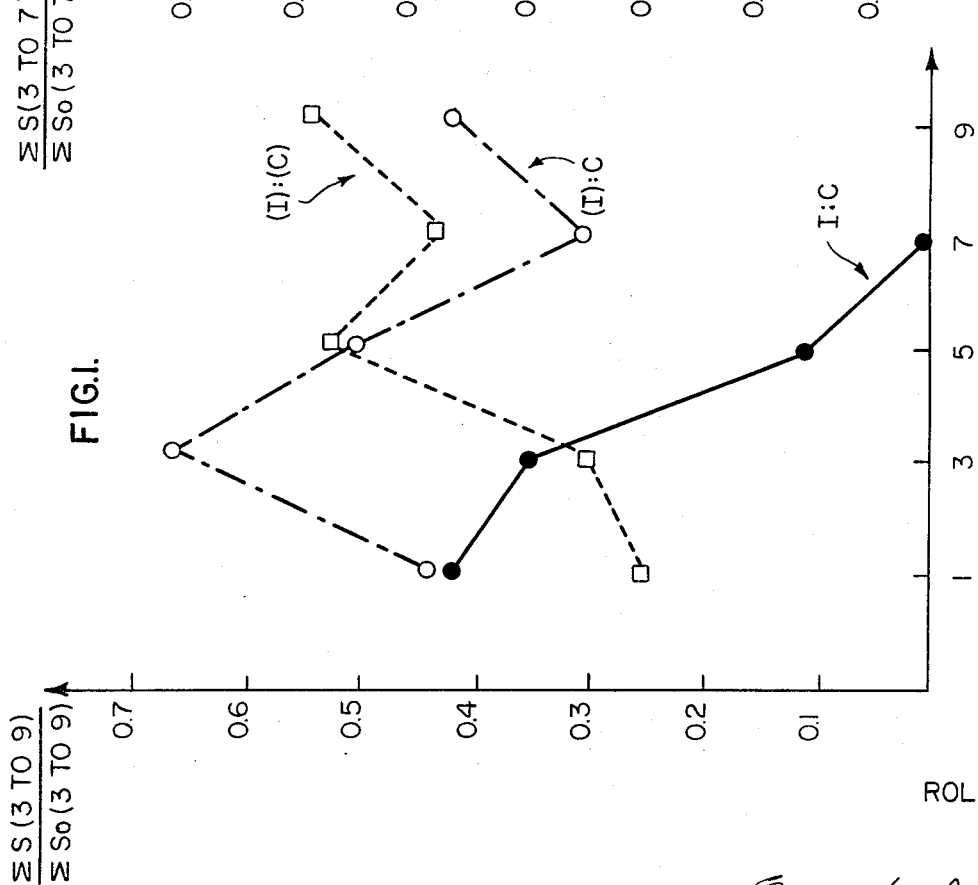

ABSTRACT OF THE DISCLOSURE

Complex substances capable of provoking the release or formation of interferon or viral inhibitory proteins when introduced into a host are produced by reacting single-stranded or multi-stranded nucleic acid polymers with cationically charged polymers having a molecular weight between about $10^3$ and $10^8$ in specified proportions, e.g. 10 parts of nucleic acid polymer to 1 part to 100 parts cationic polymer by weight.

---

The present invention relates to a process for the preparation of complex substances capable of provoking the release or formation of interferon and/or viral inhibitory proteins, that is, intracellular proteins, by animals or tissues cultures infected with viruses, and which restrain the reproduction of these and other viruses in infected animal or tissue culture.

It has been established that all known viruses comprise nucleic acid strands constituted of molecules of purines and pyrimidines attached to ribose or deoxyribose and attached to each other by molecules of phosphoric acid. It is also known that the virus nucleic acid duplicates by the formation of a duplex or triplex strand of nucleic acid that later separates, with formation of new duplex or triplex strands that separate again, and that the process continues to repeat itself.

Infected cells, under certain conditions, produce a defense mechanism whose production is provoked or initiated by the presence of multiple-stranded viral nucleic acid.

Double-stranded nucleic acid made from molecules of polyribonucleotides of cytosine and hypoxanthine [by the nomenclature of Inman and Baldwin, J. Mol. Biol., 5, 172 (1962)] are effective in provoking the release and/or the formation of interferon in animals into which they are injected. Triple-stranded synthetic nucleic acids, such as those formed by polymerisation of polyadenylic acid with polyuridylic acid, are much less effective in provoking the formation of interferon under similar conditions.

The possibility was envisaged to enhance this inducer-action by an augmentation of the complexity of the inducer molecules, by incorporation of a third polymer capable of binding to the free phosphate groups or to reactive sites of these groups that are part of single-stranded, double-stranded or triple-stranded nucleic acids.

Copolymers of pyran, acrylic and methacrylic acid polymers have been proposed to induce the formation of interferon, but these products are slightly toxic. A less toxic polymer of poly-inosinic acid and polycytidylic acid (I:C) acts as an inducer of interferon only during a very short time period, namely, two to three days (see FIG. 1, below).

The invention will be better understood from the description which follows taken in conjunction with the drawings in which:

FIG. 1 is a graph showing the time sequence of animal resistance to viral challenge by one combination of interferon inducing materials; and FIG. 2 is a graph depicting an assay of different concentrations of DEAE-D on the capability of one combination of interferon inducing materials.

The present invention provides other complex products of polynucleotides capable of inducing the formation of interferon in situ for a more prolonged time period and devoid of toxicity.

The present invention aims, principally, at providing a safe and efficient process for the production of complexes of this type, devoid of undesirable side-effects and exhibiting uniform and reproducible results.

The present invention is based on the interaction between polycationic substances, such as diethylaminoethyl dextran (DEAE-Dextran) with polymers of nucleic acids.

DEAE-Dextran is a polymer of DEAE-glucose of molecular weight between $10^3$ to $10^8$, preferably from $10^4$ to $10^7$, cationically charged, that is, having sites of electrically positive charges. Such polycations have the capacity to bind to negatively charged reactive sites, particularly to free phosphoric acid groups of nucleic acids of single, double, triple or more complex strands. Due to the complexity of the polymers, this reaction depends upon certain conditions and the stability of the product of reaction against degradation or reversion requires certain precautions, as hereinafter described.

Certain polynucleotides and analogs, such as polyribonucleotides of cytosine (Poly-C); polyribonucleotides of hypoxanthine (Poly-I); polyadenylic acid (Poly-A); polyuridylic acid (Poly-U); pyran copolymer, DEAE-Dextran and others polycationic polymers are commercially available or can be produced in the laboratory.

Starting with single-stranded nucleic acid polymers, these are dissolved, preferably at a concentration of 1 mg./ml. in an aqueous ionic solution containing salts of sodium, potassium or others, at a pH from 7.0 to 10.0, preferably close to 7.0 to 7.2, buffered by Tris-HCl and maintained at a temperature not exceeding 20° C. Tris-HCl is the designation for the reagent, Tris (hydroxymethyl-amino)-ethane.

DEAE-Dextran is produced as an aqueous solution in a concentration of 20 mg./ml. In general, in order to effect the reaction, it is convenient to dilute the nucleic acid polymer to a concentration of 100 to 200 micrograms/ml. by incorporation of a solution of NaCl (0.15 molar) and Tris-HCl (0.02 molar), pH 7.0, or other corresponding buffer, working at a temperature between 0° C. and 90° C., preferably between 20° C. and 60° C. The temperature should not be permitted to exceed 90° C. because heating the materials to boiling point destroys the nucleic acid complexes.

The reaction is carried out by slowly adding an equal volume of a DEAE-Dextran solution to a portion of the diluted nucleic acid solution or reverse. Particularly preferred single-stranded polynucleic acids are polyinosinic acid (I) and polycytidylic acid (C) and homologues and analogues such as pyran copolymer and acrylic and methacrylic acid polymers. After complexing of the polycation with each of the single-stranded nucleic acids, a complexing of the two single-stranded polynucleotides into a double-strand is achieved. This is accomplished by mixing the solutions of the two complexed single-stranded nucleic acids, either two complexes earlier formed between polynucleic acid strands and the polycation (DEAE-Dextran or others) can be mixed, or a complex earlier formed between one nucleic acid strand and the polycation can be mixed with a free nucleic acid strand not complexed with the polycation, to achieve the desired double (or triple) strand.

In addition to complex formation between the free polynucleotides, two other combinations are possible. The first, when only one polynucleotide strand (I or C) is first coated with DEAE-Dextran, and the second, when each of the two polynucleotides are first bound to DEAE-Dextran.

The formation of interferon induced by injection of nucleic acids complexed with a polycation into a host in the manner described is much more prolonged than the formation of interferon as a result of injection of free nucleic acid double-strands, as well be apparent from the results shown in FIG. 1 which shows the time sequence to virus challenge when only one polynucleotide strand (I or C) is first coated with polycation DEAE-Dextran and also when both polynucleotide strands are first bound to DEAE-Dextran.

The polynucleotides were injected at a dose of 50 micrograms and the virus challenges were done at 1, 3, 5, 7 and 9 days. It will be seen in FIG. 1 that the protective effect of I:C is highest one day after the injection of this polymer and is nil 7 days later. A delaying effect takes place with (DEAE-D+I):C, where the peak of resistance occurs 3 days after the injection of the polymer. With (DEAE-D+I):(C+DEAE-D), that is (coated I):(coated C), the delay is shifted towards even later times with the maximum protection occurring 5 to 9 days after the administration of the polymer.

In order to obtain an enhancement of the induction or release of interferon, instead of a retardation, the nucleic acid and polycation should be complexed in the following way.

First, the double-strand or triple-strand of nucleic acid is formed, and only thereafter can the complexing of this polynucleic acid double-strand (or triple-strand) with the polycation, in particular DEAE-Dextran, be achieved. The relative proportions of DEAE-Dextran or other polycations necessary to obtain a complex which has markedly greater power to induce interferon is less than that indicated in previously described procedures in which the best results were obtained when equal amounts (w./w.) or excess of polycation was used to complex with single-stranded nucleic acid, so as not to precipitate any part of the complex.

By the use of single-stranded DNA, it has been shown that the molecular weight of the nucleic acid has an influence on the amounts of DEAE-Dextran needed to precipitate it or form a colloid (Maes et al., Biophys. Biochem. Acta, 1967, 134, 269-276). In the case of I:C, it was found that no fundamental differences existed between this RNA complex and native DNA, but the proportions of DEAE-Dextran needed to show characteristic effects were much lower, due to its low molecular weight. The addition of DEAE-Dextran to I:C in relative final proportions (w./w.) of 0.1, 0.2, 0.4 and 1.0 resulted in the formation of a colloid for the two first proportions, a heavy precipitate occurred at 0.4 and the colloidal state was regained at 1.0.

Forty micrograms of I:C were injected in mice and compared with the same doses of the complex after its coating with DEAE-Dextran at the above mentioned proportions. Challenge was done 1 to 5 days later. It is clear from the data presented in FIG. 2 that the proportion 0.4 suppresses the effect of I:C. Of the three remaining combinations, the 1:10 proportion is superior to free I:C in giving better protection to mice against challenge, up to 5 days after its administration. It is, however, seen at that time, that the regaining of the colloidal state by excess of cationic polymer gives some protection against viral infection, since the 1:1 proportion is better than the 1:2.5 proportion.

In the present invention, a maximum production of interferon occurs when 1:10 DEAE-Dextran (w./w.) was added to the double-stranded nucleic acid. Higher concentrations tend to precipitate the complex and yield less induction of interferon and hence less protection against viral disease.

The amounts of polycation needed to obtain the best results vary with the type of polycation used. In these reactions of polymerisation, other polycations can be used instead of DEAE-Dextran, such as dimethylaminoethyl dextran, diethylaminomethyl dextran and other derivatives within the previously indicated range of molecular weights. Polymers of basically charged amino acids, such as polyornithine and polylysine; or even basically charged natural proteins, such as histone and protamine; as well as lysozyme; and finally synthetic cationic polyelectrolytes, such as hexadimethrine bromide can be used. All these agents served adequately as third strand protecting nucleic acid inducers of interferon, with protamine being equal almost to DEAE-Dextran in its enhancing effect.

This is seen by using a less potent interferon or viral inhibitory protein inducer. For example, a triple-stranded complex of A:U barely gives any protection against a viral challenge, but increased animal resistance to a lethal viral challenge occurs when this A:U nucleic acid complex is further complexed with cationic polymers.

Table 1 gives the percentage of resistance seen in animals challenged with lethal doses of virus and previously inoculated with A:U complexed with various cationic polymers, as compared to that of the same nucleic acid complexed with DEAE-Dextran, whose resistance induction is considered to be 100%.

TABLE 1.—COMPARATIVE PROTECTION EFFICACY OF DIFFERENT CATIONIC POLYMERS

| Complexes inoculated | Day of viral challenge ||
|---|---|---|
| | 1 (percent) | 4 (percent) |
| A:U plus DEAE-Dextran | 100 | 100 |
| A:U plus protamine | 70 | 85 |
| A:U plus histone | 60 | 70 |
| A:U plus hexadimethrine bromide | 60 | 80 |
| A:U plus poly-ornithine | 55 | 60 |
| A:U plus poly-lysine | 55 | 45 |
| A:U plus lysozyme | 45 | 60 |
| A:U alone | 5 | 0 |

Similarly, although here above reference was made principally to the polymers of inosinic and cytidylic acids (I:C), which are the most effective nucleic acid inducers of interferon known, other polynucleic acid-homopolymers or heteropolymers, such as those of adenine, uracil, xanthine, guanine, dihydrouracil (A, U, X, G, DHU) or these polynucleotides and their copolymers, I and C inclusive, such as A:U, A:I, or the nucleotides partially dephosphorilysed, such as CpA, CpU, CpC, and other nucleic acid analogs such as pyran copolymer, acrylic acid and methacrylic acid polymers, within a scale of pH situated between the isoelectric point of these polynucleotides and their degradation or dissociation point can be used.

In general, the reactive products can be applied in their soluble form or dispersed in the isotonic medium for preparation of vaccines and products injectable for immunisation and protection against viral diseases. The complexes formed can be isolated from the reacting fluid by conventional techniques, such as centrifugation, ultracentrifugation, adsorption, chromatography or lyophylisation.

What is claimed is:

1. The process of making an interferon inducer which comprises an electrostatic interaction in an ionic aqueous environment at a temperature between 0° C. and 90° C. and in the presence of at least one alkali metal salt, of a polynucleotide with a linear basic polyamine polymer.

2. The process of claim 1 wherein the polynucleotide is selected from the group consisting of single-stranded, double-stranded or triple-stranded nuclei acids interacting with linear basic polymers selected from the group consisting of dialkylaminoalkyl dextran, synthetic polymers of basic aminoacids such as lysine, histidine, tryptophane, arginine, ornithine, basic proteins, such as protamine, histones, lysozyme, and synthetic macromolecules such as hexadimethrine bromide.

3. Process in accordance with claim 2 wherein the double-stranded or triple stranded nuclei acid is formed by copolymerisation in situ of two single-stranded polynucleotides.

4. Process in accordance with claim 2 wherein a single-stranded polynucleotide already complexed through electrostatic interaction with a basic polymer is complexed with another single-stranded nuclei acid.

5. Process of claim 2 wherein a single-stranded polynucleotide already electrostatically bound to a basic polymer is complexed with another single-stranded nuclei acid already bound to a basic polymer.

6. Process in accordance with claim 2 wherein the polycation exhibits a molecular weight between $10^3$ and $10^8$.

7. Process according to claim 6 wherein the molecular weight is between $10^4$ and $10^7$.

8. The process of claim 1 wherein the pH is between about 7.0 and 7.2 and the temperature is between 20° C. and 60° C.

9. The process of claim 1 wherein the mineral salt present is NaCl.

10. The process of claim 1 wherein the process is carried out in the presence of a buffer and the buffer is Tris (hydroxy-methyl-amino-ethane) brought to a suitable pH by HCl.

References Cited

UNITED STATES PATENTS

| | | | |
|---|---|---|---|
| 2,089,227 | 8/1937 | Ruskin | 260—211.5 R |
| 3,300,476 | 1/1967 | Zahn et al. | 260—211.5 R |
| 3,427,383 | 2/1969 | Lapidus et al. | 260—211.5 R |
| 3,429,868 | 2/1969 | Kominato | 260—211.5 R |
| 3,438,968 | 4/1969 | Glasky | 260—211.5 R |
| 3,488,256 | 1/1970 | High et al. | 195—28 N |

LEWIS GOTTS, Primary Examiner

J. R. BROWN, Assistant Examiner

U.S. Cl. X.R.

195—68; 260—112, 209 D, 211.5 R; 424—85, 94, 177, 180